Aug. 6, 1935.  A. O. ABBOTT, JR., ET AL  2,010,049
TESTING APPARATUS FOR TIRES
Filed Jan. 13, 1931
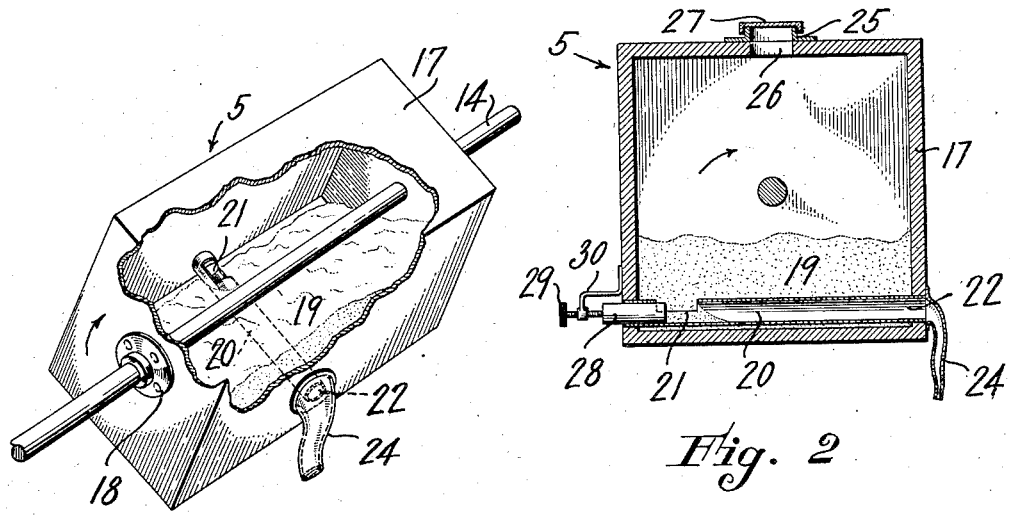
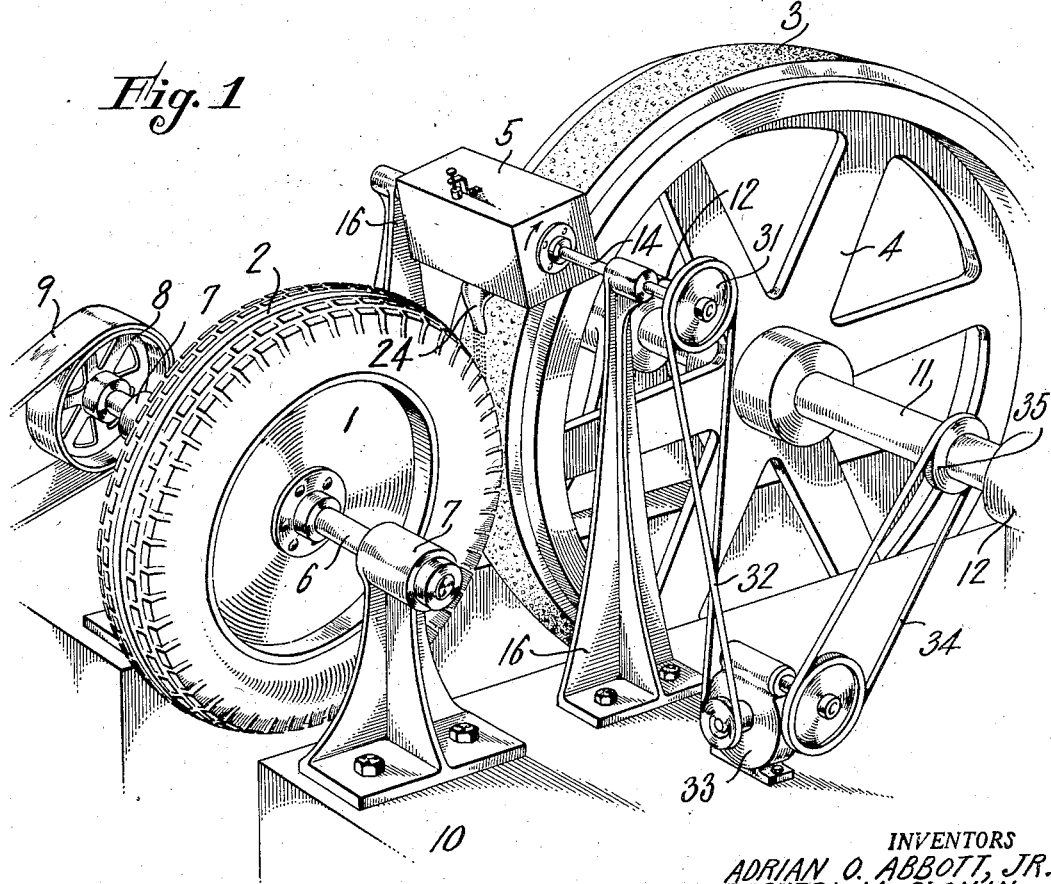
INVENTORS
ADRIAN O. ABBOTT, JR.
CHERI M. SLOMAN
BY
ATTORNEYS.

Patented Aug. 6, 1935

2,010,049

UNITED STATES PATENT OFFICE 2,010,049

TESTING APPARATUS FOR TIRES

Adrian O. Abbott, Jr., Grosse Pointe Park, and Cheri M. Sloman, Detroit, Mich., assignors, by mesne assignments, to United States Rubber Company, New York, N. Y., a corporation of New Jersey Application January 13, 1931, Serial No. 508,390

4 Claims. (Cl. 73—51)

Our invention relates to testing apparatus for tires and more particularly to apparatus for supplying dusty material to the engaging surfaces of a test track and a tire under test.

In determining the wearing characteristics of tires, and particularly automobile tires, it is customary to mount a tire on a wheel carried by supports and provided with driving means, such as a motor. The tire bears against a test track which may be either in the form of an endless belt or the surface of a wheel. The driving motion of the tire is imparted to the track to move the latter. The pressure exerted by the tire on the track may be varied to simulate different conditions of tire loading. Under such conditions the rotation of the tire in engagement with the movable track simulates actual driving conditions. If desired the track surface may be provided with abrading material and/or cleats to represent obstructions met in road driving.

If the tire is subjected to an abrasion or wear test in such apparatus, a considerable amount of frictional heat is developed. Also a considerable amount of abraded material is present. Owing to the heat developed there is a tendency for the abraded or freed particles of rubber to adhere to the face of the tire and/or the face of the track. Sometimes the abraded material clings together and attaches itself to the tread configurations of the tire and/or remains in the tread grooves or notches. At other times small masses of the abraded material are thrown against the track to which they adhere and are again brought into engagement with the tire surface. Either of these conditions results in the building up of small bodies of the abraded material which are liable to produce non-uniform testing conditions and thereby interfere with the accuracy of the test. Furthermore, such testing apparatus does not have present small particles of dust and/or road grit such as are encountered in actual road work.

We provide testing apparatus of the general character just described in which provision is made for periodically applying dusty material to the engaging surfaces of the tire and track. The presence of such dusty material tends to cover the rubber particles freed from the tire with a coating which prevents their adherence to the tire and/or track. The surfaces of the tire are also covered with a coating of dust which prevents the abraded particles of rubber from attaching themselves to the tire face. If the testing conditions are such that the rubber on the tire is heated and tends to become tacky, a greater amount of the dust is held to the tire.

The dust coated abraded material is readily removed from the tire and track so that uniform testing conditions are obtained therebetween. It is to be understood that our dusting apparatus may be applied to different types of testing apparatus.

The accompanying drawing illustrates a present preferred embodiment of our invention, in which Figure 1 is a perspective broken view of a container for dusting material;

Fig. 2 is a transverse sectional view thereof; and

Fig. 3 is a perspective view of a testing machine incorporating our dusting device.

Referring to the drawing, a tire testing machine comprises a wheel 1 carrying a tire 2 which bears against a track 3 illustrated as a surface of a wheel 4. A dusting device 5 is mounted for applying dust to the engaging surfaces of the tire 2 and track 3 to prevent the abraded particles of the tire from adhering to the engaging surfaces of the tire and/or track thereby interfering with the uniformity of the test being conducted on the tire 2. The presence of the dust tends to coat the abraded particles and the surfaces of the tire and track so that the particles do not attach themselves thereto. As abrasion tests of tires are usually accompanied by a material elevation of the temperature of the tire, and particularly the abraded rubber, there is a tendency for the rubber in the tire and separated particles to become tacky and stick. The presence of the coating of dust on the tire and abraded particles of rubber overcomes the tendency for the freed or abraded particles to attach themselves to the tire 2 and track 3. The function of the dust is primarily to serve as a covering for such freed material and not to act as an abrasive in addition to the track surface. Dust is met with under normal road conditions.

The wheel 1 is mounted on a shaft 6 which is supported by bearings 7. The shaft 6 is provided with a pulley 8 which is driven by a belt 9 attached to a motor or other driving device not shown. The tire 2 drives the wheel 4 which is carried by a shaft 11 running in bearings 12 mounted on the base 10. The presence of such a load attached to the shaft 11 simulates the resistance offered by the driving movement of an automobile in motion.

The dusting device 5 is mounted on a shaft 14 supported by brackets 16 and is positioned above and substantially in the plane of tangency of the tire 2 and track 3, so that the dust is applied to the engaging surfaces, although it is preferable to have the dust engage the track 3 slightly in advance of its engagement with the tire 2.

The shaft 14 extends through a container 17 for dusty material. Flanges 18 attached to the container 17 and the shaft 14 secure the latter in a rigid condition. As illustrated, the container 17 is rectangular in form, although it is to be understood that other shapes of container may be utilized. Preferably the container is filled substantially half way with the dusty material 19. A tube 20 is positioned along one of the inner surfaces of the container 17. The tube is provided with a notch 21 at its leading end, that is in the direction of rotation, so that when the tube is at the bottom of the container a measured quantity of the material 19 enters the tube through the opening 21, as shown in Fig. 2. As the container rotates, in a clockwise direction as viewed in the figures of the drawing, the leading end of the tube 20 is raised out of the material 19, partially by the falling movement of the material, so that as the tube approaches a vertical position the segregated quantity of the material in the tube slides downwardly towards a discharge end 22 which is external to the container. A flexible tube 24, an example of which is soft rubber, is attached to the container over the outlet 22.

The rubber tube may be tapered or otherwise shaped so that the discharged dusty material may be more easily and uniformly distributed onto the surface of the testing track and/or tire, than would be the case were it discharged directly from the opening 22. Also the tube 24 may directly contact with the moving track surface without any detrimental effect to the tube. By so discharging the dusty material directly against the track, the material may be applied without a wide spread distribution and a resulting waste of material and liberation of dust in the surrounding atmosphere. With the foregoing arrangement a predetermined quantity of dust is liberated upon each revolution of the container 17.

The container 17 is provided with a cap 25 surrounding an opening 26 for filling the container. Preferably the cap is provided with threads for engaging internal threads on a cover 27. The amount of material delivered during each revolution of the container 17 may be varied by increasing or decreasing the effective area of the opening 21. This is done by advancing or retracting a plug 28 positioned in the end of the tube 20. A set screw 29 attached to the end of the plug extends through a threaded bracket 30 carried by the container 17. Accordingly, rotation of the set screw 29 adjusts the position of the plug 28 to vary the effective opening 21.

The shaft 14 is driven by a pulley 31, and a belt 32 from a reducing gearing 33. The reducing gearing is in turn driven by a belt 34 engaging a pulley 35 mounted on the shaft 11. By suitably adjusting the reducing gearing 33 and the pulleys 31 and 35 the number of revolutions of the container 17 relative to the linear velocity of the track 3 may be varied in accordance with the amount of dust needed.

A suitable dusty material 19 consists of clean sharp sand and whiting mixed together in such quantity that the whiting adheres to the surfaces of the sand. The sand primarily serves as a vehicle for transferring the whiting from the container 17 to the track and tire surfaces. By using the sand as a carrying means, a substantial elimination of free dust in the atmosphere during the testing operation is obtained. It is to be understood, however, that other dusty materials may be used as desired.

While we have shown and described a present preferred embodiment of our invention, it is to be understood that it may be otherwise embodied within the spirit of the invention and the scope of the appended claims.

Having thus described our invention, what we claim and desire to protect by Letters Patent is:

1. The combination with a support for a tire, a travelling test track, and means for causing relative movement between a tire mounted on said support and said track, of a container for dusty material disposed above at least a portion of said track and having means for periodically applying dusty material to said track for preventing adhesion of rubber thereto.

2. The combination with a support for a tire, a travelling test track, means for causing relative movement between a tire mounted on said support and said track, of a container for dusty material disposed above at least a portion of said track and having means for periodically applying dusty material to said track for preventing adhesion of rubber thereto, and means for moving said container in synchronism with the relative movement between said track and a tire being tested.

3. In a dust applying device, supporting means, a shaft supported thereby, a container mounted for rotation with said shaft, a tube disposed along an outer wall of the container with an opening at its leading end in the direction of rotation of the container for receiving a predetermined amount of the material within the container, said tube having a discharge opening disposed rearwardly from said first-mentioned opening, and means for varying the effective area of the first-mentioned opening.

4. The combination with a support for a tire, a movable testing track mounted on stationary supports adjacent to said tire support to directly engage a tire mounted on said tire support and means for producing relative movement between said tire and said track for abrading the rubber in said tire and tending to cause accumulation of tacky rubber particles, of means for applying dusty material to the area of engagement between the said tire and track for preventing the accumulation of such tacky material comprising a container for the dusty material mounted above the area of engagement between said tire and track and having an outlet for directing dusty material to at least one of the engaging surfaces.

ADRIAN O. ABBOTT, Jr.
CHERI M. SLOMAN.